United States Patent Office 3,380,529
Patented Apr. 30, 1968

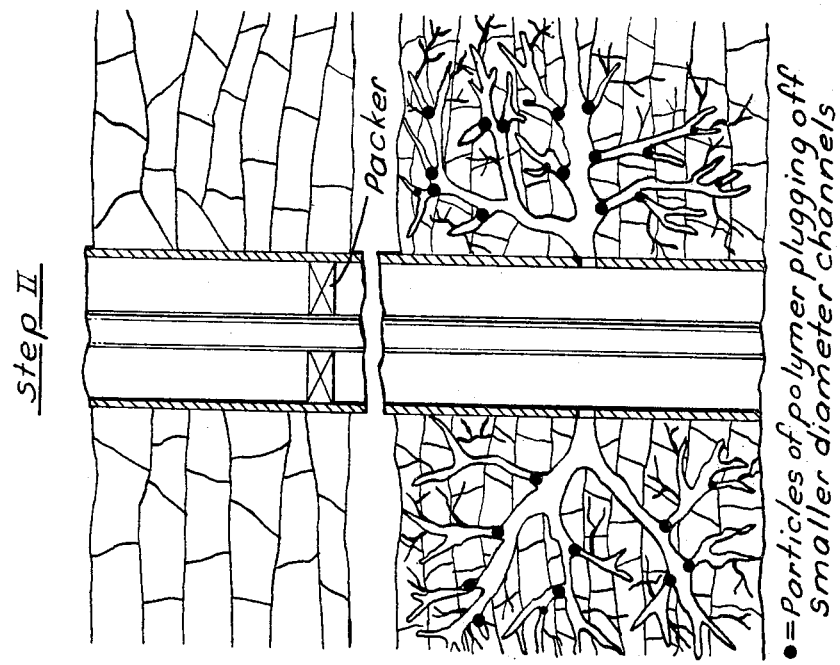
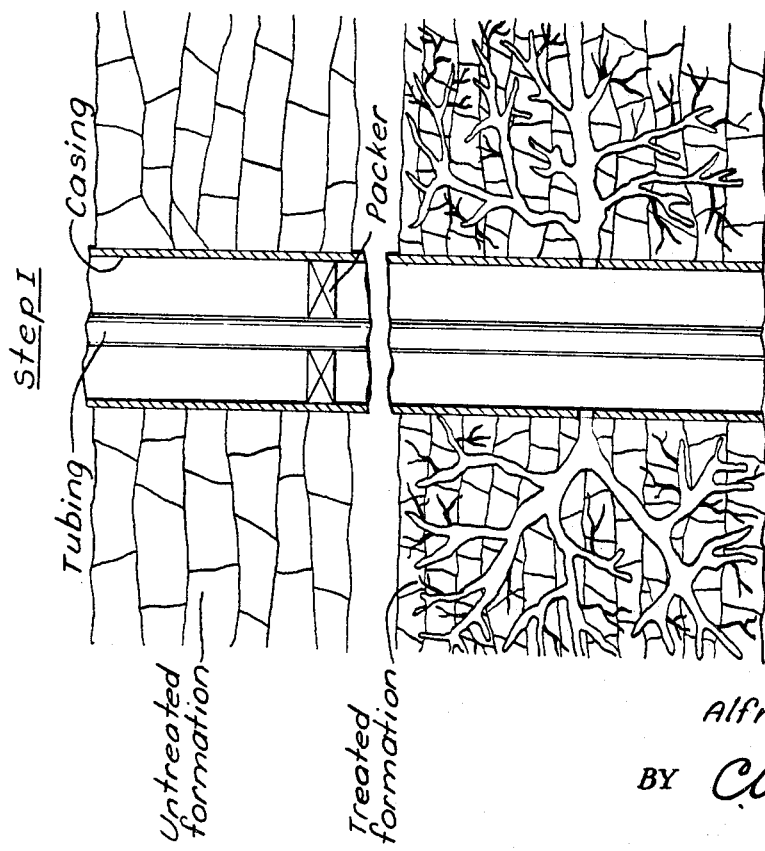

3,380,529
METHOD OF ACIDIZING A FLUID-BEARING FORMATION
Alfred R. Hendrickson, Tulsa, Okla., assignor to The Dow Chemical Company, Midland, Mich., a corporation of Delaware
Filed Oct. 23, 1964, Ser. No. 405,960
8 Claims. (Cl. 166—33)

ABSTRACT OF THE DISCLOSURE

A method of acidizing earthen formations, chemically reactive to low pH liquid media which is performed in two steps, the first being an injection down a wellbore into the formation of an acidic liquid, at less than fracturing pressure, to initiate chemical attack on the formation and the second being an injection of an acidic liquid containing dispersed therein a compressible polymer material of specified particle size, substantially insoluble in the acidic liquid, at sufficient pressure to force the polymer particles progressively into the newly formed smaller channels close to the wellbore, thereby at least partially plugging them and resulting in the injected acidic liquid being forced along the more open channels to effect acidic attack at greater distances from the wellbore.

---

This invention pertains to acidizing a calcium carbonate-containing formation, e.g. one composed, at least in part, of dolomite or limestone. In fluid-bearing formations, from which it is desired to obtain the fluid for use by man (prominent among such fluids being water, oil, brine, and various types of gases) some permeability of interconnecting channels must exist in the formation. It has been the practice to treat formations to increase the permeability. One such method is known as acidizing. It is used in calcium carbonate-containing formations and comprises injecting into the formation a mineral acid, usually having intermixed therewith an inhibitor to acidic attack on metal parts of equipment. The acid, almost always as an aqueous solution thereof, chemically attacks the calcium carbonate with which it comes in contact, converting portions thereof to the calcium salt of the acid, $CO_2$, and water. The calcium salt formed is usually extensively water-soluble and is readily flowed out from the well after treatment.

A difficulty encountered in acidizing as heretofore practiced is that of controlling the direction and extent of the acidizing process. Very often the acidic treating solution attacks the rock in the immediate vicinity of the wellbore vigorously, dissolving relatively large portions of the formation and becoming spent within a short distance from the wellbore. As a result, the fluid-bearing portions of the formation at any appreciable distance from the wellbore remain substantially unaffected by the treatment.

This is particularly true when it is desired that acidizing be carried out at pressures which are less than those which fracture the formation (acidizing at such less pressures being known as matrix acidizing). In matrix acidizing, the acidizing fluid moves through the formation slowly, and, unless provision is made to inhibit or postpone its action, becomes substantially spent in the immediate vicinity of its entrance into the formation.

In the course of progress of acidizing techniques, efforts have been made to extend the distance to which an acidizing composition penetrates a formation before becoming spent. Such efforts have included the use of retarders to the chemical action of the acidizing composition on the formation.

The employment of retarders of various description, have not been completely satisfactory. Additives for this purpose such as gums or cellulose derivatives are common as are special formulations such as emulsions. Although these materials do reduce the rate at which the acid reacts, they do nothing to decrease the condition best described as "tree-rooting." That is, as the acid penetrates in to the pores of the formation, it reacts and produces a channel from this and similar main channels many small branching channels occur. The result is a system which resembles the root system of a plant. All of these channels act to decrease the effective penetration of a given volume of acid.

The invention is predicated on the principle of plugging off of lateral small cross-section branching channels from main or principal channels as quickly as can be done, during acidizing. It is known that small channels spend the acid considerably faster than the larger channels because the surface area of the channels (which may be considered substantially cylindrical for purposes of illustration) is inversely proportional to the radius. As a result, there is greater proportion of the acidizing fluid within a channel of relatively small cross-section in reactive contact with the confining wall of the channel than there is in a channel of relatively large cross-section and the effective reaction rate of an acidizing composition on the formation decreases as the diameter of the channel in which it is contained increases.

Under a given set of conditions, acid will react at a constant rate per unit area, for example, lb./sq. ft./sec. and is a measure of the reaction rate (or spending rate) of the acid. Accordingly, the larger the surface area exposed per unit volume of acid, the faster the effective reaction rate or spending time.

It can be seen therefore, that acid spends itself more quickly in small channels than in larger channels in inverse proportion to the radius, thus limiting the depth of penetration attainable.

The area to volume relationship in channels can be shown by the following mathematical expression (assuming the channels to be cylindrical for purposes of illustration).

If a channel of length $l$, and radius, $r$, is assumed, then the volume, V, of the channel is $\pi r^2 l$ or:

$$V = \pi r^2 l$$

The surface area A of such a channel can be represented by the formula:

$$A = 2\pi r l$$

The area to volume ratio $A/V$ is then:

$$\frac{2\pi r l}{\pi r^2 l}$$

or simplified $$\frac{A}{V} = \frac{2}{r}$$

As can be seen, small values of $r$ (small diameter channels) result in large area to volume ratios, thus increasing the "effective spending rate."

There, accordingly, exists a need for an acidizing composition which does not become spent immediately or very shortly after entering the formation from the wellbore, but desirably, permits itself to be forced along larger channels in the formation extending from the wellbore and thereby treating a zone surrounding the wellbore which is definitely larger than the zone treated according to conventional acidizing.

The invention is a method of acidizing a formation penetrated by a well which contemplates forcing an acidizing solution, at less than fracturing pressure, into a formation in a manner such than channels will be created which extend from the wellbore a distance which is considerably greater than that heretofore realized by acidizing operations. By the practice of the invention, the acidizing composition first begins the attack upon the formation, in a similar manner to that first initiated by conventional practice, whereby channels of various sizes are etched into the formation in the vicinity of the wellbore. However, at this point, the progress of the creation of channels and the etched pattern being formed, in accordance with the invention, deviates markedly from that occurring in conventional practice. According to the invention, the channels of the etched pattern, of smaller cross-section, thereupon become substantially plugged whereas the larger channels remain open.

It is desirable, in the practice of the invention, that the branched or lateral channels be plugged off as quickly as possible. Unless such is done, the aforementioned relationship of area to volume of the numerous small channels would result in the acid therein becoming spent at a high rate, thereby sharply lessening the amount of acid available for deeper penetration.

Furthermore, as these small channels accept any spent acid, they grow in size. This increase in size affects the flow characteristics within the formation. Small increases in the radius of the channels greatly increase the flow capacity of the channel. Thus, the small channels will begin accepting more and more acid. The net effect of this increased flow capacity coupled with the effective spending rate reduction, attributable to the increased size, is a tendency to create channels of more uniform size in the vicinity of the wellbore.

According to the invention, unspent active acid is forced along the larger channels farther and farther back into the formation. The entrance of the acidizing composition into the smaller branches, as they continue to be formed, is continuously at least partially blocked and the acid thereby is chiefly confined in the larger channels. As treatment continues, channels are extended farther from the wellbore. The resulting increased depth of penetrations of the acid enlarges the acidized zone and tends to produce a more uniform acidized pattern which in turn, results in an improvement in production capacity of the well.

The invention is carried out in two steps. The first step comprises injecting an aqueous acidizing composition, containing no plugging agent, into a formation at less than fracturing pressures generally less than one pound per square foot per foot of well depth. The second step comprises admixing with some of the same or similar acidizing composition a selected polymer of a specified particle size having elastic properties to enable such particles to compress and adjust to irregular size channels, and injecting the thus treated acidizing composition into the formation. The amount of polymer to employ is from about 0.01 percent, by weight of the acidizing solution, to that which results in a composition which is too viscous or an amount which is economically unsound in view of the improved benefits resulting from increased amounts. From about 1 to about 100 pounds of the polymer per 1000 gallons of the acid solution is usually used.

Reference to the annexed drawing will be found to be an aid to understanding the application of the principle of the invention. In the drawing, consisting of FIGURES 1 and 2, there are shown two views of pertinent portions of a wellbore, provided with the conventional perforated casing, tubing, and packer, penetrating a fluid-bearing subterranean formation. FIGURE 1 represents such wellbore during step 1 of the invention, i.e. when the formation is being subjected to the action of an aqueous acidizing composition containing no plugging agent, or at least no appreciable amount thereof. FIGURE 2 represents the same wellbore during step 2 of the invention, i.e. when an aqueous composition containing selected polymer of the nature and size required by the invention, as described hereinbelow. FIGURE 1 illustrates the random pattern of etched channels, preponderantly made up of innumerable rootlike branching channels, the smaller of which are suggestive of hair roots of plants. FIGURE 2 illustrates the plugging effectuated in step 2 of the invention whereby polymer particles have effectively plugged and closed off the small channels thereby deterring the acidizing composition from further entrance thereinto and consequently caused the composition to follow the larger channels (through which it moves relatively fast accompanied by relatively less chemical activity) to more remote portions of the fluid-bearing reservoir of the formation when the unspent acid continues to acidize and enlarge the producing zone.

Illustrative of an acidizing solution to employ in the invention is about 1 to about 30% by weight aqueous solution of HCl, preferably containing also between about 0.1 and 1.5 percent by weight of an inhibitor to acidic attack on metals. Usually between about 10 and about 50 pounds of the polymer per 1000 gallons of the aqueous acid solution are used.

The polymer employed is one which is insoluble but dispersible in aqueous acid solutions. Any polymer that meets this requirement is useful in the practice of the invention.

Examples of polymeric materials suitable for the practice of the invention are those which are insoluble in, but swell in at least one of the group of aqueous liquids, including water, brine solutions and acid solutions, and include limited crosslinked polyurethanes, polystyrene sulfonates, polyacrylamides, polyvinyltoluene sulfonates, polyvinylpyrrolidones, polyvinylmorpholinone, and polyammoniumacrylate. Other polymers which in particulate form are swollen by aqueous liquids are also satisfactory for well treatment in the purview of this invention, such as those of U.S. Patent 2,810,716. Methods of polymerization of suitable polymers may be found in U.S. Patent 2,810,716 including the use of cross-linking materials of the nature of an alkylidene-bisphenol, e.g. N,N'-methylene-bisacrylamide.

The preferred polymer to employ in the invention is a copolymer prepared by polymerizing a polyoxyalkylene glycol of a molecular weight of between about 2,000 and 50,000 and a diisocyanate in a molar ratio of between about 2 and about 3 of the diisocyanate to the glycol.

The size of the polymer particles to employ is such that, when dispersed and swollen in the acid solution, they are small enough to flow freely along the larger channels and fractures but are too large to flow any distance into a secondary or adventitious type channel. The particles also should, in general, not be so large but that they can enter the larger passageways without shearing. It is preferred to employ a range of particle sizes, having present a substantial percent of fine particles to cause plugging of the myriad of small channels present. The upper limit of a size of particle is governed primarily by the size of the channel openings within the formation during injection of the acid-carried polymer particles.

The size of the particulate polymer employed in the acid composition of step 2 of the invention is dependent largely upon the characteristic of the $CaCO_3$-containing rocks of the formation to attain the objectives set out immediately above. In general the sizes should be such that not over about 10% thereof are larger than about 2.8 millimeters and not over about 10% thereof are smaller than about 0.075 millimeter. However, in substantially uniform high $CaCO_3$ rock, the use of some particles, in an amount of between about 5 and 15%, of a size as large as about 6.0 millimeters is recommended. Best results are obtained when the polymer particles employed vary in size, covering a relative wide range of sizes, at least about 90% thereof being between about 7 and about 200 mesh (United States Bureau of Standards Sieve Series).

The preferred polymer to employ in the practice of the invention may be made by one of the two general procedures set out below.

Illustrative of the first of such procedures is as follows: 100 parts by weight of a suitable polyglycol such as polyoxyethylene glycol or polyoxypropylene glycol, of a molecular weight on the order of 20,000 and containing about 500 p.p.m. of sodium as sodium acetate, are mixed with about 1200 parts by weight of benzene in a dry reaction vessel equipped with stirring and heating facilities. The mixture is heated to remove water. Following this, about 1.3 parts by weight of tolylene diisocyanate are added to the reaction mixture and the temperature brought to about 80° C. and held for 1.5 hours; another 1.3 parts tolylene diisocyanate are added to the reaction mixture which is maintained at about 80° C. for a second period of about 1.5 hours. At this point, acetic anhydride is added in a mole-to-mole ratio to the tolylene diisocyanate and the temperature is continued at about 80° C. for about one-half hour. The limited cross-linked polyurethane polymer which is thus produced is separated from the benzene, dried, and ground to a suitable particle size, e.g., which substantially passes through a 20 mesh sieve, but is maintained upon a 200 mesh sieve (U.S. Bureau of Standards Sieve Series). Particles containing some of all sizes within this range are usually preferred for the invention. However, particles of a narrower range of size are satisfactory as well as particles of a wider range, e.g. those which include sizes which pass through about a No. 4 to No. 6 mesh sieve and range downwardly to as fine as those retained on a 325 mesh sieve or less.

The second of the procedures for the preparation of the preferred polymer is as follows: 3.3 parts by weight of dimethyldioctadecyl ammonium bentonite are dispersed in 300 parts per weight of kerosene and heated to about 100° C. To this is added 150 parts by weight of polyoxyethylene glycol, molecular weight in the range of 9,000, while maintaining the temperature at about 95° to 100° C. About 45 parts by weight of a light hydrocarbon, such as heptane, are added and moisture present in the components is removed by heating under a partial vacuum. The mixture is brought to about 65° C. and about 4.5 parts of tolylene diisocyanate are added, followed by the addition of about 0.07 part by weight of trimethylenediamine contained in about 7 parts by weight of benzene. The resulting reaction is allowed to continue for about one-half hour at about 65° C. when about 2.5 parts by weight of acetic anhydride are added. The reactants are held for about one-half hour more at 65° C., then allowed to cool. Spherical particles of polymer of suitable size for use in the practice of the invention are formed. When soaked in hydrochloric acid solution, the particles swell to about forty times their original volume.

It is to be understood that the above examples are illustrative only, and other ratios and temperature, within the art of preparing the polymers may be employed.

The following example shows the efficacy of the invention.

*Example*

A well drilling into a limestone formation is desired to be acidized to improve the production of oil therefrom. Using conventional acidizing equipment, 500 gallons of 15% by weight hydrochloric acid, inhibited against the attack on metal goods in the well, is displaced down the tubing and into the formation at pressures less that that necessary to create fractures. Following this first stage of acid, 500 gallons of similarly inhibited hydrochloric acid containing 5 pounds of a polyoxyalkylene glycol-diisocyanate polymer having a particle size, when in the acid, of between about 8 and 200 mesh, are injected into the formations at less than fracturing pressures. The well is then shut in for a short period of time to insure complete reaction of the acid with the formation, after which time the well is placed in production. Because of the desirable increase in penetration afforded by the diversion of the acid into the larger channels, the productivity of the well is increased.

It is contemplated that best results may be obtained by repeating the steps of the invention to insure an acidized zone of desired dimensions. Such repeated treatment comprises (1) injecting an aqueous acid solution and (2) injecting an acid composition containing the polymer of suitable size range; thereafter repeating steps (1) and (2) as often as the conditions of the well and formation indicate as advisable. Among such conditions are: the radius of the producing zone of the well being created, permeability of the original unacidized zone to acidized zone, and size of the wellbore. A measure of the radius of the producing zone of the well is the existing or required well spacing for the field.

Having described my invention, what I claim and desire to protect by Letters Patent is:

1. The method of acidizing a calcium carbonate-containing subterranean formation penetrated by a well comprising (1) injecting down the wellbore of the well, at less than fracturing pressures, an aqueous solution of a mineral acid to initiate an etched pattern in the formation having branches of relatively small cross-section; (2) injecting down the wellbore at less than fracturing pressures an acid composition comprising an aqueous solution of a mineral acid, containing dispersed therein at least 0.01 percent by weight of a dispersible polymer, insoluble in said acid solution and having a particle size such that about 90 percent of the particles are not larger than about 2.8 millimeters and not smaller than about 0.075 millimeter after dispersion in said solution, said polymer particles being sufficiently elastic to compress and adjust to irregular size channels, and forcing the polymer-containing aqueous acid solution into the formation, whereby the polymer particles progressively, at least partially, plug the branches of smaller cross-sections created and thus deter the treating solution from further entrance thereinto and cause the treating composition to follow larger channels to greater distances from the wellbore and alternately repeating steps (1) and (2) until a producing zone is improved permeability has been created having a radius extending an appreciable distance from the wellbore.

2. The method according to claim 1 wherein the polymer is employed in an amount of between about 1 and 100 pounds per 1000 gallons of the acidic solution.

3. A multiple stage method of acidizing a calcium carbonate-containing subterranean formation penetrated by a well which comprises the steps of (1) injecting an aqueous acid solution containing between about 1 and 30 percent by weight HCl at less than fracturing pressures; (2) injecting an aqueous acidic solution containing between about 1 and 30 percent by weight HCl, containing dispersed therein a cross-linked polymer which is dispersible in said acid solution but insoluble therein, said polymer having a size range which results, when dispersed, in a free flowing composition which flows through the main channels of the formation being treated but is of a size which is too large to flow any distance down the smaller branches, as a result of which the smaller branches become at least partially plugged, thereby directing the acidizing composition containing the polymer particles along the main channels to more remote portions of the formation and thereafter repeating steps (1) and (2) until permeability at some distance from the wellbore is substantially improved.

4. The method according to claim 3 wherein the acid used is a 10 to 20 percent solution of HCl.

5. The method according to claim 4 wherein the acid contains an inhibitor to the corrosion of the acid on metals in an amount between about 0.01 and 1.5 percent, based on the weight of the acidic solution.

6. The method according to claim 3 wherein the polymer is prepared by copolymerizing a diisocyanate and a polyoxyalkylene glycol selected from the class consisting of polyoxyethylene glycol and polyoxyalkylenepropylene glycol in the presence of between about 175 and 6,000 parts per million parts of diisocyanate and glycol present, of a cross-linking agent, said polymer having a molecular weight of between about 2,000 and 50,000 and a particle size after dispersion in said acid solution such that at least 90 percent is between about 7 mesh and 200 mesh.

7. The method according to claim 6 wherein the diisocyanate employed is tolylene diisocyanate and the polyoxyalkylene glycol is polyoxypropylene glycol.

8. The method of claim 6 where polymers are chosen from groups consisting of polyacrylamide, polyurethane, polyvinyl morpholinone, polyvinyl pyrrolidinone, polystyrene sulfonate, polyvinyl toluene sulfonate, and polyammonium acrylate

References Cited

UNITED STATES PATENTS

| | | | |
|---|---|---|---|
| 2,689,230 | 9/1954 | Cardwell et al. | 166—42 X |
| 2,803,306 | 8/1957 | Hower | 166—42 X |
| 2,804,145 | 8/1957 | Holbrook | 166—42 X |
| 3,122,204 | 2/1964 | Oakes | 166—42 |
| 3,145,773 | 8/1964 | Jorda et al. | 166—33 X |
| 3,160,206 | 12/1964 | Jorda | 166—42 X |
| 3,252,904 | 5/1964 | Carpenter | 166—42 X |

STEPHEN J. NOVOSAD, *Primary Examiner.*